(12) United States Patent
Shahana et al.

(10) Patent No.: US 11,787,498 B2
(45) Date of Patent: Oct. 17, 2023

(54) CONTROL DEVICE FOR HUMAN-POWERED VEHICLE

(71) Applicant: Shimano Inc., Osaka (JP)

(72) Inventors: Satoshi Shahana, Osaka (JP); Mitsuhiko Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 296 days.

(21) Appl. No.: 15/930,833

(22) Filed: May 13, 2020

(65) Prior Publication Data

US 2020/0361562 A1    Nov. 19, 2020

(51) Int. Cl.
| | | |
|---|---|---|
| *B62M 6/45* | (2010.01) | |
| *B62K 11/00* | (2006.01) | |
| *B62J 45/00* | (2020.01) | |
| *B62M 6/70* | (2010.01) | |
| *B62J 45/40* | (2020.01) | |

(52) U.S. Cl.
CPC .............. *B62M 6/45* (2013.01); *B62J 45/00* (2020.02); *B62K 11/00* (2013.01); *B62M 6/70* (2013.01); *B62J 45/40* (2020.02)

(58) Field of Classification Search
CPC . B62M 6/00; B62M 6/40; B62M 6/45; B62M 6/70; B62K 11/00; B62J 45/00
See application file for complete search history.

(56) References Cited

U.S. PATENT DOCUMENTS

| | | | |
|---|---|---|---|
| 2019/0144070 A1 | 5/2019 | Shahana et al. | |
| 2019/0241234 A1* | 8/2019 | Hattori | B62J 50/22 |

FOREIGN PATENT DOCUMENTS

| | | | | |
|---|---|---|---|---|
| CN | 1161923 | A | 10/1997 | |
| CN | 103057654 | A | 4/2013 | |
| CN | 203372349 | U | 1/2014 | |
| CN | 104554612 | A | 4/2015 | |
| CN | 107662689 | A | 2/2018 | |
| CN | 109720496 | A | 5/2019 | |
| EP | 0893338 | A1 * | 1/1999 | |
| EP | 1 878 650 | B1 | 12/2008 | |
| EP | 2377713 | A1 * | 10/2011 | .......... B60L 15/2009 |
| JP | 8-113184 | A | 5/1996 | |
| JP | 9-156571 | A | 6/1997 | |
| JP | 9-207866 | A | 8/1997 | |
| JP | H09207866 | * | 8/1997 | |
| JP | 10-59260 | A | 3/1998 | |

(Continued)

*Primary Examiner* — Blane J Jackson
(74) *Attorney, Agent, or Firm* — Global IP Counselors, LLP

(57) ABSTRACT

A control device for a human-powered vehicle includes an electronic controller configured to control a motor, which is configured to apply a propulsion force to the human-powered vehicle, so as to change a ratio of an assist force produced by the motor to a human driving force in accordance with the human driving force. The electronic controller controls the motor so that the assist force produced by the motor becomes smaller than a maximum value upon determining a torque of the human driving force is smaller than a first predetermined value, and controls the motor so that the assist force produced by the motor becomes equal to the maximum value upon determining the torque of the human driving force becomes equal to the first predetermined value, and the first predetermined value is a value in a range of 50 Nm or greater and 130 Nm or less.

17 Claims, 8 Drawing Sheets

(56) References Cited

FOREIGN PATENT DOCUMENTS

| | | | | |
|---|---|---|---|---|
| JP | 2000-142548 | A | | 5/2000 |
| JP | 2001-80570 | A | | 3/2001 |
| JP | 2002-240772 | A | | 8/2002 |
| JP | 2015-182600 | A | | 10/2015 |
| JP | 3200367 | U | * | 10/2015 ................ B62J 6/00 |
| WO | WO-2009142199 | A1 | * | 11/2009 .............. B60L 15/20 |

* cited by examiner

CONTROL DEVICE FOR HUMAN-POWERED VEHICLE

CROSS-REFERENCE TO RELATED APPLICATIONS

This application claims priority to Japanese Patent Application No. 2019-094044, filed on May 17, 2019. The entire disclosure of Japanese Patent Application No. 2019-094044 is hereby incorporated herein by reference.

BACKGROUND

Technical Field

The present invention generally relates to a control device for a human-powered vehicle.

Background Information

Japanese Laid-Open Patent Publication No. 10-59260 discloses an example of a human-powered vehicle configured to control the motor such that the ratio of the assist force produced by the motor to the human driving force becomes equal to a predetermined ratio.

SUMMARY

One object of the present disclosure is to provide a control device for a human-powered vehicle configured to control a motor in a suitable manner.

In accordance with a first aspect of the present disclosure, a control device is provided for a human-powered vehicle in which the control device comprises an electronic controller configured to control a motor, which is configured to apply a propulsion force to the human-powered vehicle, so as to change a ratio of an assist force produced by the motor to a human driving force in accordance with the human driving force. The electronic controller is configured to control the motor so that the assist force produced by the motor becomes smaller than a maximum value upon determining a torque of the human driving force is smaller than a first predetermined value, and to control the motor so that the assist force produced by the motor becomes equal to the maximum value upon determining the torque of the human driving force becomes equal to the first predetermined value, and the first predetermined value is a value in a range of 50 Nm or greater and 130 Nm or less.

In accordance with the control device of the first aspect, since the assist force produced by the motor becomes equal to the maximum value upon determining a torque of the human driving force becomes equal to the first predetermined value, which is a value in a range of 50 Nm or greater and 130 Nm or less, the assist force produced by the motor is increased until the torque of the human driving force reaches the first predetermined value, which is a value in the range of 50 Nm or greater and 130 Nm or less. Therefore, the motor is controlled in a preferred manner.

In accordance with a second aspect of the present disclosure, the control device according to the first aspect further comprises a data storage, in which the data storage is configured to store information related to the first predetermined value in a changeable manner.

In accordance with the control device of the second aspect, since the first predetermined value stored in the data storage is changed, the first predetermined value suitable for a rider, a traveling environment, and the like is set.

In accordance with a third aspect of the present disclosure, a control device is provided for a human-powered vehicle in which the control device comprises an electronic controller and a data storage. The data storage is configured to control a motor, which is configured to apply a propulsion force to the human-powered vehicle, so as to change a ratio of an assist force produced by the motor to a human driving force in accordance with the human driving force. The electronic controller is configured to control the motor so that the assist force produced by the motor becomes smaller than a maximum value upon determining a torque of the human driving force is smaller than a first predetermined value, and to control the motor so that the assist force produced by the motor becomes equal to the maximum value upon determining the torque of the human driving force becomes equal to the first predetermined value, and the data storage is configured to store information related to the first predetermined value in a changeable manner.

In accordance with the control device of the third aspect, the assist force produced by the motor is increased until the torque of the human driving force reaches the first predetermined value. Further, the first predetermined value stored in the data storage is changed. Thus, the first predetermined value suitable for the rider, the traveling environment and the like is set.

In accordance with a fourth aspect of the present disclosure, in the control device according to any one of the first to third aspects, the electronic controller is configured to control the motor so that the ratio becomes less than or equal to 200 percent.

In accordance with the control device of the fourth aspect, since the ratio of the assist force produced by the motor to the human driving force is set to less than or equal to 200 percent (%), enlargement of the motor can be avoided.

In accordance with a fifth aspect of the present disclosure, in the control device according to the fourth aspect, the electronic controller is configured to control the motor so that torque of the assist force produced by the motor becomes smaller than the torque of the human driving force upon determining the torque of the human driving force is smaller than a second predetermined value that is smaller than the first predetermined value, and the electronic controller is configured to control the motor so that the torque of the assist force produced by the motor becomes greater than or equal to the torque of the human driving force upon determining the torque of the human driving force is greater than or equal to the second predetermined value.

In accordance with the control device of the fifth aspect, upon determining the torque of the human driving force is smaller than the second predetermined value, the assist force produced by the motor is reduced and the consumption of electric power is decreased. Upon determining the torque of the human driving force is greater than or equal to the second predetermined value, the load on the rider is reduced.

In accordance with a sixth aspect of the present disclosure, in the control device according to the fourth aspect, the electronic controller is configured to control the motor so that torque of the assist force produced by the motor becomes smaller than the torque of the human driving force upon determining the torque of the human driving force is smaller than the first predetermined value.

In accordance with the control device of the sixth aspect, upon determining the torque of the human driving force is smaller than the first predetermined value, the assist force produced by the motor is reduced and the consumption of electric power is decreased. Furthermore, enlargement of the motor can be avoided.

In accordance with a seventh aspect of the present disclosure, in the control device according to the sixth aspect, the electronic controller is configured to control the motor so that the torque of the assist force produced by the motor becomes smaller than the torque of the human driving force.

In accordance with the control device of the seventh aspect, the assist force produced by the motor is reduced and the consumption of electric power is decreased. Furthermore, enlargement of the motor can be avoided.

In accordance with an eighth aspect of the present disclosure, in the control device according to any one of the first to seventh aspects, the electronic controller is configured to control the motor so as to change a change ratio of an increasing width of a torque of the assist force produced by the motor to an increasing width of the torque of the human driving force upon determining the torque of the human driving force is smaller than the first predetermined value.

In accordance with the control device of the eighth aspect, the motor is controlled so as to change a change ratio of an increasing width of a torque of the assist force produced by the motor to an increasing width of the torque of the human driving force upon determining the torque of the human driving force is smaller than the first predetermined value.

In accordance with a ninth aspect of the present disclosure, in the control device according to the eighth aspect, the electronic controller is configured to control the motor so as to increase the change ratio of the increasing width of the torque of the assist force produced by the motor to the increasing width of the torque of the human driving force as the torque of the human driving force increases upon determining the torque of the human driving force is smaller than the first predetermined value.

In accordance with the control device of the ninth aspect, the motor is controlled so as to increase the change ratio of the increasing width of the torque of the assist force produced by the motor to the increasing width of the torque of the human driving force as the torque of the human driving force increases upon determining the torque of the human driving force is smaller than the first predetermined value.

In accordance with a tenth aspect of the present disclosure, in the control device according to any one of the first to ninth aspects, the electronic controller is configured to drive the motor in accordance with the human driving force upon determining the torque of the human driving force changes from a value smaller than a third predetermined value, which is smaller than the first predetermined value, to a value larger than or equal to the third predetermined value.

In accordance with the control device of the tenth aspect, the motor is driven in accordance with the human driving force upon determining the torque of the human driving force changes from a value smaller than a third predetermined value, which is smaller than the first predetermined value, to a value larger than or equal to the third predetermined value. Therefore, the assist force of the motor is not produced until the torque of the human driving force reaches the third predetermined value.

In accordance with an eleventh aspect of the present disclosure, in the control device according to any one of the first to tenth aspects, in at least part of a range in which the torque of the human driving force is less than or equal to the first predetermined value, the electronic controller is configured to control the motor so that a first change ratio of an increase in an output of the motor to an increase in the human driving force upon determining the human-powered vehicle starts to travel from a still state becomes higher than a second change ratio of an increase in the output of the motor to an increase in the human driving force upon determining the human-powered vehicle is traveling.

In accordance with the control device of the eleventh aspect, in at least part of a range in which the torque of the human driving force is less than or equal to the first predetermined value, the motor is controlled so that a first change ratio of an increase in an output of the motor to an increase in the human driving force in a case where the human-powered vehicle starts to travel from a still state and a second change ratio of an increase in the output of the motor to an increase in the human driving force in a case where the human-powered vehicle is traveling are suitable change ratios. Therefore, the load on the rider is reduced upon determining the human-powered vehicle starts to travel from a still state.

In accordance with a twelfth aspect of the present disclosure, in the control device according to any one of the first to eleventh aspects, the electronic controller is configured to control the motor so that the ratio differs between a case where an output of the motor is increased in accordance with an increase in the human driving force and a case where the output of the motor is decreased in accordance with a decrease in the human driving force.

In accordance with the control device of the twelfth aspect, the motor is controlled so that a suitable ratio is obtained for each of a case where an output of the motor is increased in accordance with an increase in the human driving force and a case where the output of the motor is decreased in accordance with a decrease in the human driving force.

In accordance with a thirteenth aspect of the present disclosure, in the control device according to the twelfth aspect, the electronic controller is configured to control the motor so that the ratio in a case where the output of the motor is increased in accordance with an increase in the human driving force is larger than the ratio in a case where the output of the motor is decreased in accordance with a decrease in the human driving force.

In accordance with the control device of the thirteenth aspect, since the ratio is larger upon determining the output of the motor is increased in accordance with an increase in the human driving force than upon determining the output of the motor is decreased in accordance with a decrease in the human driving force, the load on the rider is reduced during acceleration of the human-powered vehicle, and the consumption of electric power is controlled during deceleration of the human-powered vehicle.

In accordance with a fourteenth aspect of the present disclosure, a control device is provided for a human-powered vehicle in which the control device comprises an electronic controller configured to control a motor, which is configured to apply a propulsion force to the human-powered vehicle, so as to change a ratio of an assist force produced by the motor to a human driving force in accordance with the human driving force. The electronic controller is configured to control the motor so that the assist force produced by the motor becomes smaller than a maximum value upon determining a power of the human driving force is smaller than a first predetermined value, and to control the motor so that the assist force produced by the motor becomes equal to the maximum value upon determining a power of the human driving force becomes equal to the first predetermined value, and the first predetermined value is a value in a range of 200 watts or greater and 600 watts or less.

In accordance with the control device of the fourteenth aspect, since the assist force produced by the motor becomes equal to the maximum value upon determining a power of the human driving force reaches a first predetermined value which is a value in a range of 200 watts or greater and 600 watts or less, the assist force produced by the motor is increased until the power of the human driving force reaches the first predetermined value which is a value in a range of 200 watts or greater and 600 watts or less. Therefore, the motor is controlled in a preferred manner.

In accordance with a fifteenth aspect of the present disclosure, a control device is provided for a human-powered vehicle in which the control device comprises an electronic controller and a data storage. The electronic controller is configured to control a motor, which is configured to apply a propulsion force to the human-powered vehicle, so as to change a ratio of an assist force produced by the motor to a human driving force in accordance with the human driving force. The electronic controller is configured to control the motor so that the assist force produced by the motor becomes smaller than a maximum value upon determining a power of the human driving force is smaller than a first predetermined value, and to control the motor so that the assist force produced by the motor becomes equal to the maximum value upon determining the power of the human driving force becomes equal to the first predetermined value, and the data storage is configured to store information related to the first predetermined value in a changeable manner.

In accordance with the control device of the fifteenth aspect, the assist force produced by the motor is increased until the power of the human driving force reaches the first predetermined value and the first predetermined value stored in the data storage is changed. Thus, the first predetermined value that is set is suitable for a rider, a traveling environment, and the like.

A control device for a human-powered vehicle in accordance with the present disclosure is configured to control a motor in a preferred manner.

BRIEF DESCRIPTION OF THE DRAWINGS

Referring now to the attached drawings which form a part of this original disclosure.

DETAILED DESCRIPTION OF EMBODIMENTS

Figure 1:
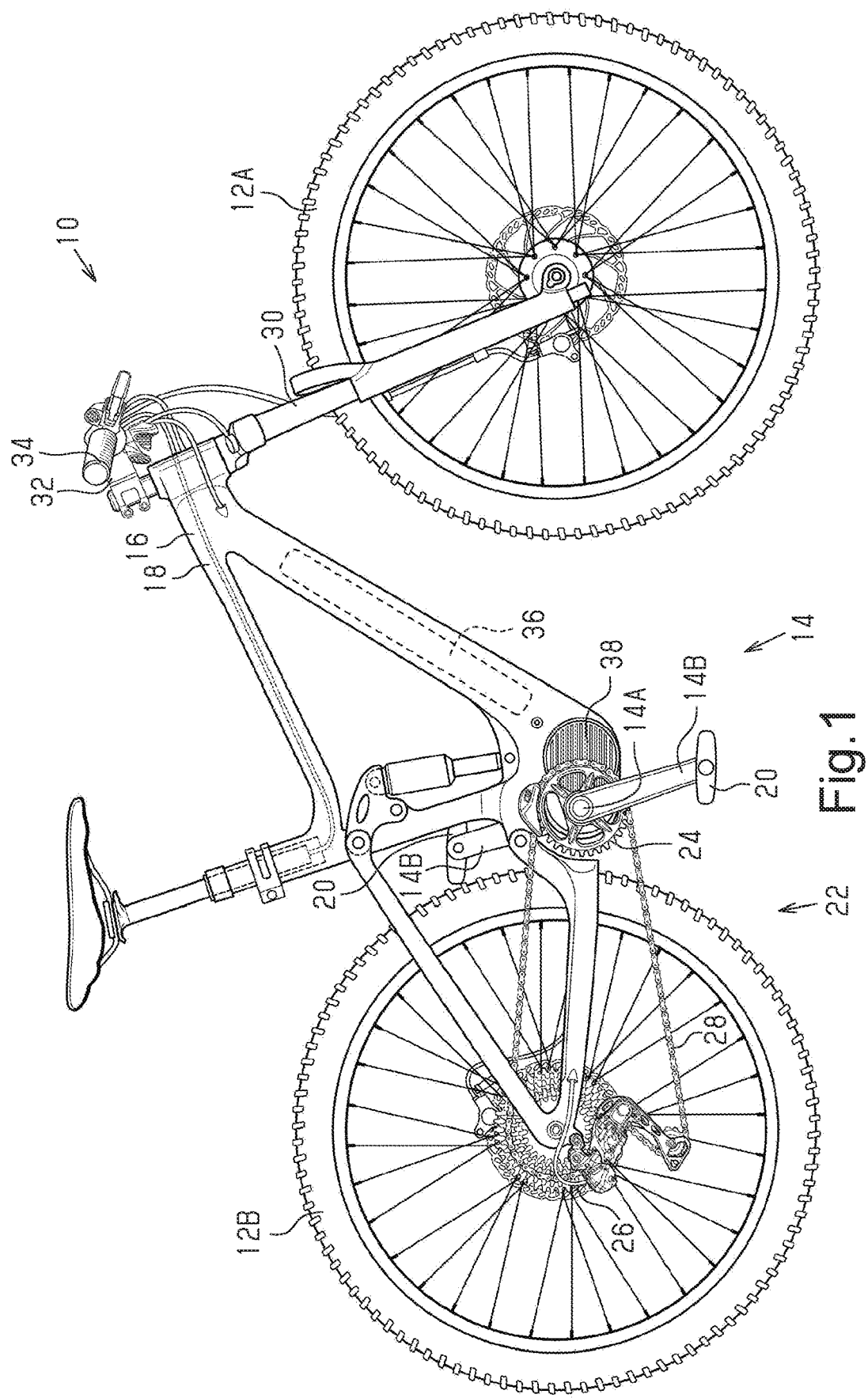
FIG. 1 is a side elevational view of a human-powered vehicle including a control device for a human-powered vehicle in accordance with a first embodiment.
Figure 2:
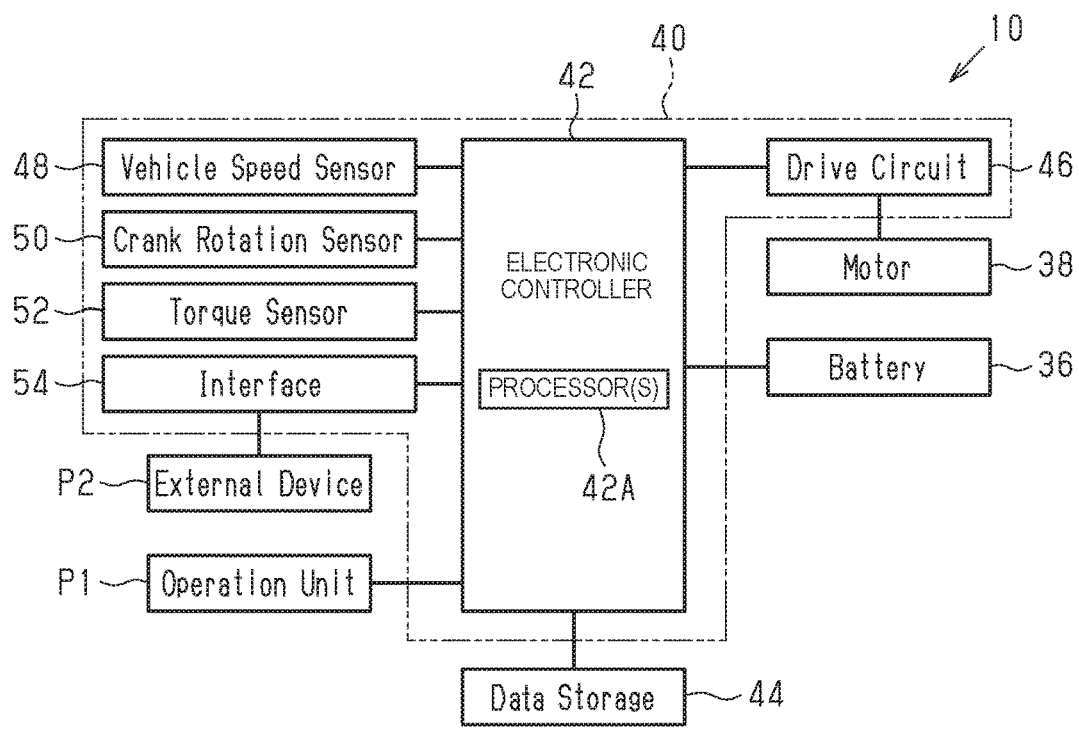
FIG. 2 is a block diagram showing an electrical configuration of the control device having an electronic controller in accordance with the illustrated embodiments.

Selected embodiments will now be explained with reference to the drawings. It will be apparent to those skilled in the human-powered vehicle field from this disclosure that the following descriptions of the embodiments are provided for illustration only and not for the purpose of limiting the invention as defined by the appended claims and their equivalents.

First Embodiment

A control device 40 for a human-powered vehicle 10 in accordance with a first embodiment will now be described with reference to FIGS. 1 to 6. The human-powered vehicle 10 is a vehicle that is configured to be driven by at least a human driving force H. The human-powered vehicle 10 includes various types of bicycles such as mountain bikes, road bikes, city bikes, cargo bikes, and recumbent bikes, as well as electric bicycles (E-bike). The number of wheels of the human-powered vehicle 10 is not limited. For example, the human-powered vehicle 10 can be a unicycle or a vehicle having three or more wheels. An electric bicycle includes an electric assist bicycle that assists propulsion of a vehicle with an electric motor. In the description hereafter, the human-powered vehicle 10 is a bicycle.

The human-powered vehicle 10 includes a first wheel 12A and a second wheel 12B. In the present embodiment, the first wheel 12A includes a front wheel, and the second wheel 12B includes a rear wheel. The human-powered vehicle 10 further includes a crank 14. The human-powered vehicle 10 further includes a vehicle body 16. The vehicle body 16 further includes a frame 18. The human driving force H is input to the crank 14. The crank 14 includes a crankshaft 14A rotatable relative to the frame 18 and crank arms 14B provided the axial ends of the crankshaft 14A. A pedal 20 is connected to each of the crank arms 14B. In the present embodiment, the rear wheel is a drive wheel. The drive wheel is driven by the rotation of the crank 14. The drive wheel is supported by the frame 18. The crank 12 and the drive wheel 14 are connected by a drive mechanism 22. The drive mechanism 22 includes a first rotary body 24 coupled to the crankshaft 14A. The crankshaft 14A and the first rotary body 24 can be coupled by a first one-way clutch. The first one-way clutch is configured to rotate the first rotary body 24 forward in a case where the crank 14 rotates forward and not to rotate the first rotary body 24 backward in a case where the crank 14 rotates backward. The first rotary body 24 includes a sprocket, a pulley, or a bevel gear. The drive mechanism 22 further includes a second rotary body 26 and a connecting member 28. The connecting member 28 transmits the rotational force of the first rotary body 24 to the second rotary body 26. The connecting member 28 includes, for example, a chain, a belt, or a shaft.

The second rotary body 26 is connected to the drive wheel. The second rotary body 26 includes a sprocket, a pulley, or a bevel gear. Preferably, a second one-way clutch is provided between the second rotary body 26 and the drive wheel. The second one-way clutch is configured to rotate the drive wheel forward in a case where the second rotary body 26 rotates forward and not to rotate the drive wheel 14 backward in a case where the second rotary body 26 rotates backward.

The second wheel 12B can include a front wheel, and the first wheel 12A can include a rear wheel. The vehicle body 16 further includes a front fork 30, a stem 32, and a handlebar 34. The front wheel is attached to the frame 18 by a front fork 30. The handlebar 34 is connected to the front fork 30 by a stem 32. In the description hereafter, the rear wheel will be described as a drive wheel. However, the front wheel can be the drive wheel. Alternatively, the front wheel and the rear wheel can both be drive wheels.

The human-powered vehicle 10 includes a battery 36 for the human-powered vehicle. The battery 36 includes one or more battery elements. The battery element includes a rechargeable battery. The battery 36 supplies electric power to the control device 40. Preferably, the battery 36 is communicates with the control device 40 through wired or wireless connection. The battery 36 is configured to communicate with the control device 40, for example, through power line communication (PLC).

The human-powered vehicle 10 includes a motor 38. The motor 38 is configured to apply propulsion force to the human-powered vehicle 10. The motor 38 includes an electric motor. The motor 38 is provided on a power transmission path of the human driving force H from the pedal 20 to the rear wheel or provided to transmit rotation to the front wheel. The power transmission path of the human driving force H from the pedal 20 to the rear wheel includes the rear wheel. In the present embodiment, the motor 38 is provided to transmit rotation to the first rotary body 24. The motor 38 can be provided on at least one of the front wheel and the rear wheel, and can be configured by, for example, a hub motor. The motor 38 and a housing in which the motor 38 is provided form a drive unit. Preferably, a third one-way clutch is provided on the power transmission path between the motor 38 and the crankshaft 14A so that the motor 38 is not rotated by the rotational force of the crank 14 in a case where the crankshaft 14A is rotated in the direction in which the human-powered vehicle 10 moves forward. The output of the motor 38 can be input to the power transmission path of the human driving force H through a reduction gear.

The control device 40 includes an electronic controller 42. The electronic controller 42 includes at least one processor 42A that executes a predetermined control program. The electronic controller 12 is formed of one or more semiconductor chips that are mounted on a circuit board. The term "electronic controller" as used herein refers to hardware that executes a software program, and does not include a human. The processor 42A includes, for example, a central processing unit (CPU) or a micro-processing unit (MPU). The processor can be provided at separate locations. The electronic controller 42 can include one or more microcomputers. For simplicity, the electronic controller 42 will hereinafter be referred to as the controller 42. Preferably, the control device 40 further includes a data storage 44. The data storage 44 stores various control programs and information used for various control processes. The data storage 44 is any computer storage device or any non-transitory computer-readable medium with the sole exception of a transitory, propagating signal. For example, the data storage 44 includes a nonvolatile memory and a volatile memory. The non-volatile memory includes, for example, at least one of Read-Only Memory (ROM), Erasable Programmable Read Only Memory (EPROM), Electrically Erasable Programmable Read-Only Memory (EEPROM), and flash memory. The volatile memory includes, for example, Random Access Memory (RAM).

Preferably, the control device 40 further includes a drive circuit 46 of the motor 38. Preferably, the drive circuit 46 and the controller 42 are provided in the housing of the motor 38. The drive circuit 46 and the controller 42 can be provided on, for example, the same circuit board. The drive circuit 46 includes an inverter circuit. The drive circuit 46 is configured to control the electric power supplied from the battery 36 to the motor 38. The drive circuit 46 is configured to communicate with the controller 42 through wired or wireless connection. The drive circuit 46 drives the motor 38 in accordance with a control signal from the controller 42.

The control device 40 is configured to control the motor 38 in accordance with the human driving force H. The control device 40 can further control the motor 38 according to at least one of the traveling speed V of the human-powered vehicle 10 and the rotational speed of the crankshaft 14A. Preferably, the control device 40 further includes a vehicle speed sensor 48, a crank rotation sensor 50, and a torque sensor 52. The human driving force H can be represented by the torque HT or the power HW.

The vehicle speed sensor 48 is configured to output information corresponding to the traveling speed V of the human-powered vehicle 10. Preferably, the vehicle speed sensor 48 is configured to detect a magnet provided on a wheel of the human-powered vehicle 10. Preferably, the vehicle speed sensor 48 is configured to output a detection signal a predetermined number of times during a single rotation of the wheel. For example, the predetermined number of times is 1. The vehicle speed sensor 48 is configured to output information corresponding to the rotational speed of the wheel of the human-powered vehicle 10. The vehicle speed sensor 48 is configured to output a signal corresponding to the rotational speed of the wheel. The controller 42 is configured to calculate the traveling speed V of the human-powered vehicle 10 based on the rotational speed of the wheel. The controller 42 is configured to calculate the traveling speed V of the human-powered vehicle 10 using, for example, information related to the rotational speed of the wheel and information related to the radius or diameter of the wheel. The information related to the radius or diameter of the wheel is stored, for example, in the data storage 44. Preferably, the vehicle speed sensor 48 includes a magnetic reed that forms a reed switch or a Hall element. The vehicle speed sensor 48 can be mounted on a chain stay of the frame 18 of the human-powered vehicle 10 to detect a magnet attached to the rear wheel or can be provided on the front fork 30 to detect a magnet attached to the front wheel. In the present embodiment, the vehicle speed sensor 48 is configured such that the reed switch detects the magnet once whenever the wheel rotates once. The vehicle speed sensor 48 can include, for example, an acceleration sensor or a GPS receiver and have any configuration as long as information corresponding to the traveling speed V of the human-powered vehicle 10 is output.

The crank rotation sensor 50 is configured to output information corresponding to the rotational speed of the crankshaft 14A. The crank rotation sensor 50 is, for example, attached to the frame 18 of the human-powered vehicle 10. The crank rotation sensor 50 is configured to include a magnetic sensor that outputs a signal corresponding to the intensity of a magnetic field. An annular magnet, of which the magnetic field intensity changes in the circumferential direction, is provided on the crankshaft 14A, a member that rotates in cooperation with the crankshaft 14A, or in a power transmission path between the crankshaft 14A and the first rotary body 24. The member that rotates in cooperation with the crankshaft 14A includes an output shaft of the motor 38, a member that forms a reduction gear, and the like. The crank rotation sensor 50 outputs a signal corresponding to the rotational speed of the crankshaft 14A. The magnet can be provided on a member that rotates integrally with the crankshaft 14A in the power transmission path of the human driving force H from the crankshaft 14A to the first rotary body 24. For example, the magnet can be provided on the first rotary body 24 in a case where the first one-way clutch is not provided between the crankshaft 14A and the first rotary body 24. The crank rotation sensor 50 can include an optical sensor, an acceleration sensor, a torque sensor, or the like instead of the magnetic sensor. Further, the crank rotation sensor 50 can have any configuration that outputs information corresponding to the rotational speed of the crankshaft 14A. The crank rotation sensor 50 is connected to the controller 42 by a wireless communication device or an electric cable.

The torque sensor 52 is configured to output information corresponding to the torque HT of the human driving force H input to the crank 14. Preferably, for example, in a case where the first one-way clutch is provided in the power transmission path, the torque sensor 52 is provided on the upstream side of the first one-way clutch in the power transmission path. The torque sensor 52 includes a strain sensor, a magnetostrictive sensor, a pressure sensor, or the like. The strain sensor includes a strain gauge. The torque sensor 52 is provided on the power transmission path or in the vicinity of a member included in the power transmission path. The members included in the power transmission path are, for example, the crankshaft 14A, a member that transmits the human driving force H between the crankshaft 14A and the first rotary body 24, the crank arm 14B, or the pedal 20. The torque sensor 52 is connected to the controller 42 through a wireless communication device or an electric cable. The power HW of the human driving force H is obtained by multiplying the torque detected by the torque sensor 52 by the rotational speed of the crankshaft 14A detected by the crank rotation sensor 50. The torque sensor 52 can be provided on, for example, the frame 18, a support that supports the crankshaft 14A, or a hub of the rear wheel. Further, the torque sensor 52 can have any configuration that outputs information corresponding to the torque HT of the human driving force H input to the crank 14.

The controller 42 is configured to control the motor 38 and change the ratio A of the assist force M produced by the motor 38 to the human driving force H in accordance with the human driving force H. The torque ratio of the torque MT of the assist force M produced by the motor 38 to the torque HT of the human driving force H of the human-powered vehicle 10 can be referred to as the ratio AT. The ratio of the power of the power MW (watt) of the assist force M produced by the motor 38 to the power HW (watt) of the human driving force H can be referred to as the ratio AW. The controller 42, for example, is configured to control the motor 38 in one control mode selected from a plurality of control modes that are different in at least part of the relationship between the human driving force H and the ratio A. The power HW of the human driving force H is calculated by multiplying the human driving force H and the rotational speed N of the crankshaft 14A. In a case where the output of the motor 38 is input to the power transmission path of the human driving force H through the reduction gear, the output of the reduction gear is used as the assist force M. In a case where the reduction gear is not provided, the power MW of the assist force M is calculated by multiplying the torque of the motor 38 and the rotational speed of the motor 38. In a case where the reduction gear is provided, the power MW of the assist force M is calculated by multiplying the output torque of the reduction gear by the output rotational speed of the reduction gear. A motor rotational speed sensor that outputs a signal corresponding to the rotational speed of the motor 38 is provided on the motor 38 or the periphery of the motor 38. The controller 42 is connected to the motor rotational speed sensor and configured to calculate the rotational speed of the motor 38 from the output signal of the motor rotational speed sensor. In a case where the reduction gear is provided, the data storage 44 is configured to store information related to the speed reduction ratio of the reduction gear. The controller 42 is configured to calculate the output rotational speed of the reduction gear from the rotational speed of the motor 38 and the information related to the speed reduction ratio of the reduction gear. The data storage 44 stores, for example, information indicating the relationship between a control command of the motor 38 and an output torque of the motor 38. The controller 42 is configured, for example, to calculate the output torque of the motor 38 from information indicating the relationship between the control command of the motor 38 and the output torque of the motor 38 stored in the data storage 44. The controller 42 is configured, for example, to calculate the output torque of the reduction gear from the output torque of the motor 38 and the information related to the speed reduction ratio of the reduction gear. The controller 42 is configured to output a control command to the drive circuit 46 of the motor 38 in accordance with the torque HT or the power HW of the human driving force H. The control command includes, for example, a torque command value. The plurality of control modes can include a control mode that does not drive the motor 38. The controller 42 can be configured to control the motor 38 in only one control mode.

For example, the controller 42 stops the motor 38 as the traveling speed V becomes greater than or equal to a first predetermined speed VA. The first predetermined speed VA is, for example, 45 km/h. The predetermined speed can be less than 45 km/h, for example, 25 km/h.

Upon determining the torque HT of the human driving force H is smaller than a first predetermined value HT1, the controller 42 is configured to control the motor 38 so that the assist force M produced by the motor 38 becomes smaller than the maximum value MX. In a case where the torque HT of the human driving force H reaches the first predetermined value HT1, the controller 42 is configured to control the motor 38 so that the assist force M produced by the motor 38 becomes equal to the maximum value MX. The first predetermined value HT1 is a value in a range of 50 Nm or greater and 130 Nm or less. Preferably, the first predetermined value HT1 is a value in a range of 70 Nm or greater and 110 Nm or less.

In a case where the assist force M is expressed by the torque MT, the torque MT includes the assist torque generated by the motor 38. In a case where the output of the motor 38 is input to the power transmission path of the human driving force H through the reduction gear, the assist torque includes the output torque of the reduction gear. In a case where the assist force M is expressed by the torque MT, the controller 42 is configured to control the motor 38 so that the torque MT becomes less than or equal to the maximum value MTX. Preferably, the maximum value MTX is a value in a range of 70 Nm or greater and 90 Nm or less. The maximum value MTX is, for example, 80 Nm. Preferably, the maximum value MTX is determined by the output characteristics of the motor 38. For example, the controller 42 can be configured to control the motor 38 so that the maximum value MX differs in a plurality of control modes.

The plurality of control modes can include a first predetermined control mode and a second predetermined control mode. The controller 42 is configured to control the motor 38 so that the assist force M produced by the motor 38 becomes equal to the maximum value MX upon determining the torque HT of the human driving force H becomes equal to the first predetermined value HT1 in the first predetermined control mode. The controller 42 can be configured to control the motor 38 so that the assist force M becomes equal to the maximum value MX upon determining the torque HT of the human driving force H becomes equal to a predetermined value that differs from the first predetermined value HT1 in the second predetermined control mode. The controller 42 can be configured to control the motor 38 so that the assist force M produced by the motor 38 becomes equal to the maximum value MX upon determining the torque HT of the human driving force H becomes equal to the first predetermined value HT1 in all of the control modes.

Preferably, upon determining the torque HT of the human driving force H is smaller than the first predetermined value HT1, the controller 42 is configured to control the motor 38 so that the torque MT of the assist force M produced by the motor 38 becomes smaller than the torque HT of the human driving force H. In the present embodiment, the controller 42 is configured to control the motor 38 such that the torque MT of the assist force M produced by the motor 38 becomes smaller than the torque HT of the human driving force H. In the present embodiment, upon determining the torque HT of the human driving force H is greater than or equal to the first predetermined value HT1, the controller 42 is configured to control the motor 38 so that the torque MT of the assist force M produced by the motor 38 becomes smaller than the torque HT of the human driving force H.

Preferably, upon determining the torque HT of the human driving force H is smaller than the first predetermined value HT1, the controller 42 is configured to control the motor 38 so that the torque HT of the assist force M produced by the motor 38 increases as the torque HT of the human driving force H increases. In the present embodiment, upon determining the torque HT of the human driving force H is smaller than the first predetermined value HT1, the controller 42 is configured to control the motor 38 so that the torque MT of the assist force M produced by the motor 38 increases as the torque HT of the human driving force H increases.

Preferably, upon determining the torque HT of the human driving force H is smaller than the first predetermined value HT1, the controller 42 is configured to control the motor 38 so that the change ratio RT of an increasing width of the torque MT of the assist force M produced by the motor 38 to an increasing width of the torque HT of the human driving force H changes. Preferably, upon determining the torque HT of the human driving force H is smaller than the first predetermined value HT1, the controller 42 is configured to control the motor 38 so that the change ratio RT of an increasing width of the torque MT of the assist force M produced by the motor 38 to an increasing width of the torque HT of the human driving force H increases as the torque HT of the human driving force H increases.

Preferably, upon determining the torque HT of the human driving force H is the second predetermined value HT2 smaller than the first predetermined value HT1, the controller 42 is configured to control the motor 38 so that a graph showing the relationship between the torque HT of the human driving force H and the torque MT of the assist force M produced by the motor 38 has an inflection point. The graph showing the relationship between the torque HT of the human driving force H and the torque MT of the assist force M produced by the motor 38 is represented by a curve showing the relationship between the torque HT of the human driving force H and the torque MT of the assist force M produced by the motor 38, or an approximate curve showing the relationship between the torque HT of the human driving force H and the torque MT of the assist force M produced by the motor 38.

Preferably, controller 42 is configured to control the motor 38 so that the ratio A becomes less than or equal to 200 percent. In the present embodiment, the controller 42 is configured to control the motor 38 so that the ratio A becomes less than or equal to 100 percent upon determining the torque HT of the human driving force H is greater than or equal to the first predetermined value HT1. The controller 42 can be configured to control the motor 38 so that the ratio AT becomes greater than or equal to 200 percent upon determining the torque HT of the human driving force H is greater than or equal to the first predetermined value HT1. The controller 42 can be configured to control the motor 38 so that the ratio AT becomes less than or equal to 100 percent in the first predetermined control mode and control the motor 38 so that the ratio AT becomes greater than or equal to 100 percent in the second predetermined control mode.

Preferably, the controller 42 is configured to drive the motor 38 in accordance with the human driving force H upon determining the torque HT of the human driving force H becomes greater than or equal to the third predetermined value HT3 from a value smaller than the third predetermined value HT3 that is smaller than the first predetermined value HT1. Preferably, the third predetermined value HT3 is a value of 3 Nm or greater and 10 Nm or less. For example, the third predetermined value HT3 is 5 Nm.

Preferably, in at least part of a range in which the torque HT of the human driving force H is less than or equal to the first predetermined value HT1, the controller 42 is configured to control the motor 38 so that a first change ratio R1 of an increase in an output of the motor 38 to an increase in the human driving force H in a case where the human-powered vehicle 10 starts to travel from a still state becomes higher than a second change ratio R2 of an increase in the output of the motor 38 to an increase in the human driving force H in a case where the human-powered vehicle 10 is traveling. For example, at least a part of the range in which the torque HT of the human driving force H is less than or equal to the first predetermined value HT1 includes, for example, a range of 0 Nm or greater and 50 Nm or less, and preferably includes a range of, for example, 5 Nm or greater and 30 Nm or less. The first change ratio R1 includes a first change ratio RT1 of an increase in the torque MT of the assist force M produced by the motor 38 with respect to an increase in the torque HT of the human driving force H in a case where the human-powered vehicle 10 starts to travel from a still state. The second change ratio R2 includes a second change ratio RT2 of an increase in the torque MT of the assist force M produced by the motor 38 with respect to an increase in the torque HT of the human driving force H in a case where the human-powered vehicle 10 is traveling. Preferably, in at least part of a range in which the torque HT of the human driving force H is less than or equal to the first predetermined value HT1, the controller 42 is configured to control the motor 38 so that a first change ratio RT1 of an increase in the torque MT of the assist force M produced by the motor 38 to an increase in the torque HT of the human driving force H in a case where the human-powered vehicle 10 starts to travel from a still state becomes higher than a second change ratio RT2 of an increase in the torque MT of the assist force M produced by the motor 38 to an increase in the torque HT of the human driving force H in a case where the human-powered vehicle 10 is traveling. The controller 42 can control the motor 38 so that the first change ratio RT1 is less than or equal to the second change ratio RT2 in at least a part of the range in which the torque HT of the human driving force H is less than or equal to the first predetermined value HT1.

Preferably, the controller 42 is configured to control the motor 38 so that the ratio A differs between a case where an output of the motor 38 is increased in accordance with an increase in the human driving force H and a case where the output of the motor 38 is decreased in accordance with a decrease in the human driving force H. Preferably, the controller 42 is configured to control the motor 38 so that the ratio AT differs between a case where an output of the motor 38 is increased in accordance with an increase in the human driving force H and a case where the output of the motor 38 is decreased in accordance with a decrease in the human driving force H. Preferably, the controller 42 is configured to control the motor 38 so that the ratio A in a case where an output of the motor 38 is increased in accordance with an increase in the human driving force H is larger than the ratio A in a case where an output of the motor 38 is decreased in accordance with a decrease in the human driving force H. Preferably, the controller 42 is configured to control the motor 38 so that the ratio AT in a case where an output of the motor 38 is increased in accordance with an increase in the human driving force H is larger than the ratio AT in a case where an output of the motor 38 is decreased in accordance with a decrease in the human driving force H.

The controller 42 can be configured to control the motor 38 so that the ratio A in a case where an output of the motor 38 is increased in accordance with an increase in the human driving force H is less than or equal to the ratio A in a case where an output of the motor 38 is decreased in accordance with a decrease in the human driving force H. The controller 42 can be configured to control the motor 38 so that the ratio AT in a case where an output of the motor 38 is increased in accordance with an increase in the human driving force H is equal to the ratio AT in a case where an output of the motor 38 is decreased in accordance with a decrease in the human driving force H.

The data storage 44 stores information related to the first predetermined value HT1. The data storage 44 further stores control information for controlling the motor 38 according to the human driving force H. In the present embodiment, the control information includes first control information used by the controller 42 for a case where the human-powered vehicle 10 starts to travel from a still state and second control information used by the controller 42 for a case where the human-powered vehicle 10 is traveling. The control information includes, for example, at least one of a table, a function, and a map in which the torque HT of the human driving force H and the assist force M produced by the motor 38 are associated. Preferably, the control information includes at least one of a table, a function, and a map in which the torque HT of the human driving force H and the torque MT of the assist force M produced by the motor 38 are associated. The control information can include, for example, at least one of a table, a function, and a map in which the torque HT of the human driving force H and the ratio A are associated. In a case where the control information includes, for example, at least one of a table, a function, and a map in which the torque HT of the human driving force H and the ratio A are associated, if the torque MT of the assist force M produced by the motor 38 becomes equal to the maximum value MTX, the controller 42 is configured to control the motor so that the torque MT of the assist force M produced by the motor 38 becomes equal to the maximum value MTX even if the torque HT of the human driving force H is increased.

Figure 3:
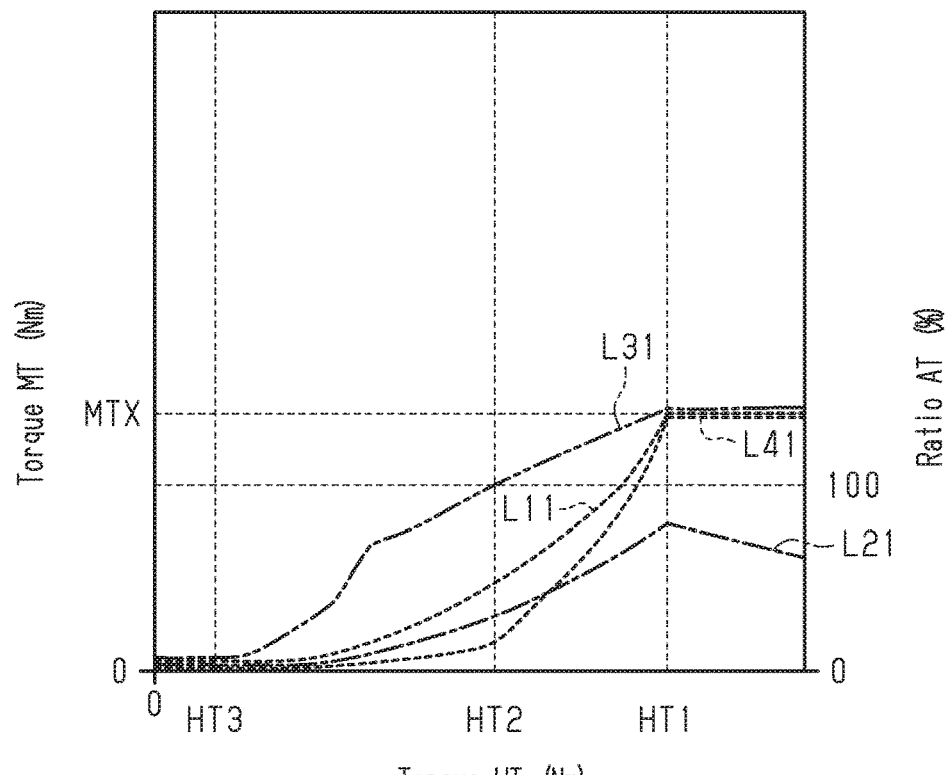
FIG. 3 is a graph that corresponds to information related to a first predetermined value stored in data storage of FIG. 2 and shows the relationship between the torque of the human driving force and the torque of the assist force produced by the motor, and the relationship between the torque of the human driving force and the ratio.

A broken line L11 shown in FIG. 3 illustrates an example of a relationship between the torque HT of the human driving force H corresponding to the second control information and the torque MT of the assist force M produced by the motor 38. In the broken line L11, the torque MT of the assist force M produced by the motor 38 in a case where the torque HT of the human driving force H is smaller than the third predetermined value HT3 is 0 Nm. The broken line L11, in a range in which the torque HT of the human driving force H is greater than or equal to the third predetermined value HT3 and less than or equal to the first predetermined value HT1, can be a downwardly bulged curve, a straight line, an upwardly bulged curve, or a bent line. In a case where the broken line L11 is a bent line in a range in which the torque HT of the human driving force H is greater than or equal to the third predetermined value HT3 and less than or equal to the first predetermined value HT1, the controller 42 can control the motor 38 so that a response speed of the change in the torque MT of the assist force M produced by the motor 38 to the change in the human driving force H at the bent point of the broken line L11 and the vicinity of the bent point decreases such that the torque MT of the assist force M produced by the motor 38 does not suddenly change in accordance with the change in the human driving force H. In FIG. 3, for example, the maximum value MTX of the torque MT is less than or equal to the first predetermined value HT1.

A double-dashed line L31 shown in FIG. 3 illustrates an example of a relationship between the torque HT of the human driving force H corresponding to the first control information and the torque MT of the assist force M produced by the motor 38. The double-dashed line L31 can be a curve that is at least downwardly curved, a straight line, an upwardly bulged curve, or a bent line. In a case where the double-dashed line L31 is a bent line, the controller 42 can be configured to control the motor 38 so that a response speed of the change in the torque MT of the assist force M produced by the motor 38 to the change in the human driving force H at the bent point of the double-dashed line L31 and the vicinity of the bent point decreases such that the torque MT of the assist force M produced by the motor 38 does not suddenly change in accordance with a change in the human driving force H.

A single-dashed line L21 shown in FIG. 3 illustrates an example of a relationship between the torque HT of the human driving force H corresponding to the second control information and the ratio AT. In the single-dashed line L21, the ratio AT in a case where the torque HT of the human driving force H is smaller than the third predetermined value HT3 is 0%. The single-dashed line L21 is a bent line that increases in accordance with an increase in the torque HT of the human driving force H in a case where the torque HT of the human driving force H is greater than or equal to the third predetermined value HT3 and less than or equal to the first predetermined value HT1. Further, the single-dashed line L21 is a bent line that decreases linearly in accordance with an increase in the torque HT of the human driving force H in a case where the torque HT of the human driving force H is greater than or equal to the first predetermined value HT1.

A process for controlling the motor 38 will now be described with reference to FIGS. 4 and 5. Upon the supply of electric power to the controller 42, in a case where the control mode of controlling the motor 38 in accordance with the human driving force is selected, the controller 42 starts the process and proceeds to step S11 in the flowchart shown in FIG. 4. Whenever the flowchart of FIG. 4 ends, the controller 42 repeats the process from step S11 in predetermined cycles until the supply of electric power is stopped. In a case where the controller 42 is configured to control the motor 38 in only one control mode, the process starts the process from step S11 in the flowchart shown in FIG. 4 upon the supply of electric power to the controller 42.

In step S11, the controller 42 determines whether the torque HT of the human driving force H increased from a value smaller than the third predetermined value HT3 to greater than or equal to the third predetermined value HT3. In a case where the torque HT of the human driving force H has not increased from a value smaller than the third predetermined value HT3 to greater than or equal to the third predetermined value HT3, the controller 42 ends the process. In a case where the torque HT of the human driving force H has increased from a value smaller than the third predetermined value HT3 to greater than or equal to the third predetermined value HT3, the controller 42 proceeds to step S12.

In step S12, the controller 42 drives the motor 38, and proceeds to step S13. In step S13, the controller 42 determines whether the human-powered vehicle 10 has started traveling from a still state. In a case where the human-powered vehicle 10 has started traveling from a still state, the controller 42 proceeds to step S14. For example, in a case where the controller 42 receives a signal from the vehicle speed sensor 48 in a state where a signal has continuously not been received from the vehicle speed sensor 48 for a first predetermined time or longer, the controller 42 proceeds to step S14. In step S14, the controller 42 is configured to control the motor 38 in accordance with the first control information, and proceeds to step S20.

In a case where the controller 42 determines in step S13 that the human-powered vehicle 10 has not started traveling from a still state, the controller 42 proceeds to step S15. For example, in a case where a state in which a signal has not been received from the vehicle speed sensor 48 is shorter than the first predetermined time, the controller 42 proceeds to step S15. In a case where the human-powered vehicle 10 is traveling, the controller 42 proceeds to step S15. In step S15, the controller 42 is configured to control the motor 38 in accordance with the second control information. The controller 42 then proceeds to step S16. For example, in a case where the human driving force H increases in step S15, the controller 42 is configured to control the motor 38 to obtain the assist force M of the motor 38 corresponding to the broken line L11 in FIG. 3. For example, in a case where the human driving force H decreases in step S15, the controller 42 is configured to control the motor 38 to obtain the assist force M of the motor 38 corresponding to the broken line L41 in FIG. 3.

In step S16, the controller 42 determines whether the torque HT of the human driving force H is greater than or equal to the first predetermined value HT1. In a case where the torque HT of the human driving force H is greater than or equal to the first predetermined value HT1, the controller 42 proceeds to step S17. In step S17, the controller 42 controls the motor 38 so that the assist force M of the motor 38 becomes equal to a maximum value MX and then proceeds to step S18. In a case where the torque HT of the human driving force H is not greater than or equal to the first predetermined value HT1 in step S16, the controller 42 proceeds to step S18.

In step S18, the controller 42 determines whether the torque HT of the human driving force H is less than or equal to a fourth predetermined value HT4. The fourth predetermined value HT4 is smaller than the first predetermined value HT1. Preferably, the fourth predetermined value HT4 is smaller than the third predetermined value HT3. The fourth predetermined value HT4 is, for example, a value of 0 Nm or greater and 4 Nm or less. In a case where the torque HT of the human driving force H is not less than or equal to the fourth predetermined value HT4, the controller 42 proceeds to step S15. In a case where the torque HT of the human driving force H is less than or equal to the fourth predetermined value HT4, the controller 42 proceeds to step S19. The controller 42 stops the motor 38 and in step S19 and then ends the process.

In step S20, the controller 42 determines whether the traveling speed V is greater than or equal to a second predetermined speed VX. The second predetermined speed VX is lower than the first predetermined speed VA, preferably less than one-half of the first predetermined speed VA. Preferably, the second predetermined speed VX is a value in a range of greater than or equal to 5 km/h to less than or equal to 10 km/h. In a case where the controller 42 determines in step S20 that the traveling speed V is greater than or equal to the second predetermined speed VX, the controller 42 proceeds to step S15. In a case where the controller 42 determines in step S20 that the traveling speed V is not greater than or equal to the second predetermined speed VX, the controller 42 proceeds to step S21.

In step S21, the controller 42 determines whether the torque HT of the human driving force H is greater than or equal to the first predetermined value HT1. In a case where the torque HT of the human driving force H is greater than or equal to the first predetermined value HT1, the controller 42 proceeds to step S22. In step S22, the controller 42 controls the motor 38 so that the assist force M of the motor 38 becomes equal to a maximum value MX and then proceeds to step S23. In a case where the torque HT of the human driving force H is not greater than or equal to the first predetermined value HT1 in step S21, the controller 42 proceeds to step S23.

In step S23, the controller 42 determines whether the torque HT of the human driving force H is less than or equal to the fourth predetermined value HT4. In a case where the torque HT of the human driving force H is not less than or equal to the fourth predetermined value HT4, the controller 42 proceeds to step S14. In a case where the torque HT of the human driving force H is less than or equal to the fourth predetermined value HT4, the controller 42 proceeds to step S19. The first predetermined value HT1 in the first control information can be different from the first predetermined value HT1 in the second control information.

Preferably, the data storage 44 is configured to store information related to the first predetermined value HT1 in a changeable manner. The controller 42 is configured to change the first predetermined value HT1 in accordance with, for example, an operation of the operation unit P1 provided on the human-powered vehicle 10 or a signal from an external device. The control device 40 can include an interface 54 configured to communicate with the external device P2. The interface 54 is electrically connected to the controller 42. The interface 54 includes, for example, at least one of a connection port of a communication line and a wireless communication device. The external device includes, for example, a smartphone, a tablet computer, and a personal computer. Preferably, the controller 42 is configured to change the first predetermined value HT1 stored in the data storage 44 in a range of 50 Nm to 130 Nm. The controller 42 is configured to change, for example, the first predetermined value HT1 stored in the data storage 44 in a range of 70 Nm or greater and 90 Nm or less.

Preferably, the first predetermined value HT1 is set in correspondence with the maximum value HTX of the torque HT of the human driving force H as the human-powered vehicle 10 travels. The maximum value HTX is, for example, an average maximum output during a traveling time set in advance by the rider. The maximum value HTX during traveling of the human-powered vehicle 10 can be a value that is suitable for the user and determined by the user. Alternatively, the maximum value HTX can be a value determined by a manufacturer through tests or the like. The maximum value HTX during traveling of the human-powered vehicle 10 for a typical rider is a value in a range of 50 Nm or greater and 130 Nm or less. With the control device 40 in accordance with the present embodiment, the assist force M produced by the motor 38 is increased until the torque HT of the human driving force H reaches the maximum value HTX. Thus, the rider is less likely to feel a lack of the assist force M produced by the motor 38 in a case where the torque HT of the human driving force H reaches the maximum value HTX.

Figure 6:
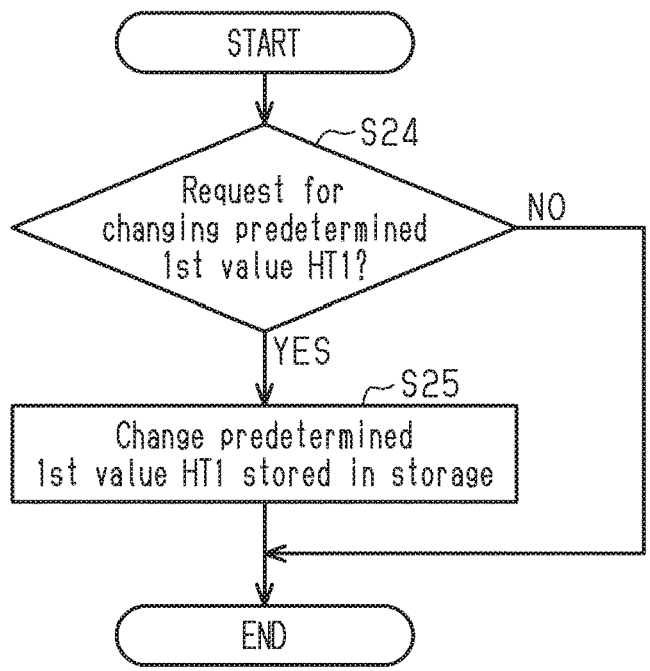
FIG. 6 is a flowchart of a process for changing a first predetermined value stored in the data storage executed by the controller in FIG. 2.

A process for changing the first predetermined value HT1 stored in the data storage 44 will now be described with reference to FIG. 6. Upon the supply of electric power to the controller 42, the controller 42 starts the process and proceeds to step S24 of the flowchart shown in FIG. 6. Whenever the flowchart of FIG. 6 ends, the controller 42 repeats the process from step S24 in predetermined cycles until the supply of electric power is stopped.

In step S24, the controller 42 determines whether there is a request for changing the first predetermined value HT1. In a case where, for example, the controller 42 receives a signal for changing the first predetermined value HT1 from the operation unit P1 provided on the human-powered vehicle 10 or the external device P2, the controller 42 determines that there is a request for changing the first predetermined value HT1. In a case where there is no request for changing the first predetermined value HT1, the controller 42 ends the process. In a case where there is a request for changing the first predetermined value HT1, the controller 42 proceeds to step S25.

In step S25, the controller 42 changes the first predetermined value HT1 stored in the data storage 44, and ends the process. In step S25, the controller 42 changes the first predetermined value HT1 by changing information related to the first predetermined value HT1. In accordance with a request for changing the first predetermined value HT1, the controller 42 can change the numerical value of the first predetermined value HT1 by 1 Nm, change the numerical value of the first predetermined value HT1 by a predetermined value, or select one of a plurality of predetermined numerical values and set the selected numerical value as the first predetermined value HT1. The information related to the first predetermined value HT1 is shown on, for example, a display device provided on the operation unit P1, a display device provided on the human-powered vehicle 10 separately from the operation portion P1, or a display device provided on the external device P2. This allows the user to recognize the current first predetermined value HT1.

Second Embodiment

A control device 40 in accordance with a second embodiment will now be described with reference to FIGS. 2, 5, 7, and 8. The control device 40 in accordance with the second embodiment is similar to the control device 40 in accordance with the first embodiment except in that the motor 38 is driven according to the human driving force H in a case where the torque HT of the human driving force H increased from 0 Nm to greater than 0 Nm. Thus, same reference numerals are given to those components that are the same as the corresponding components of the first embodiment. Such components will not be described in detail.

The controller 42 is configured to drive the motor 38 in accordance with the human driving force H in a case where the torque HT of the human driving force H increased from 0 Nm to greater than 0 Nm.

Figure 7:
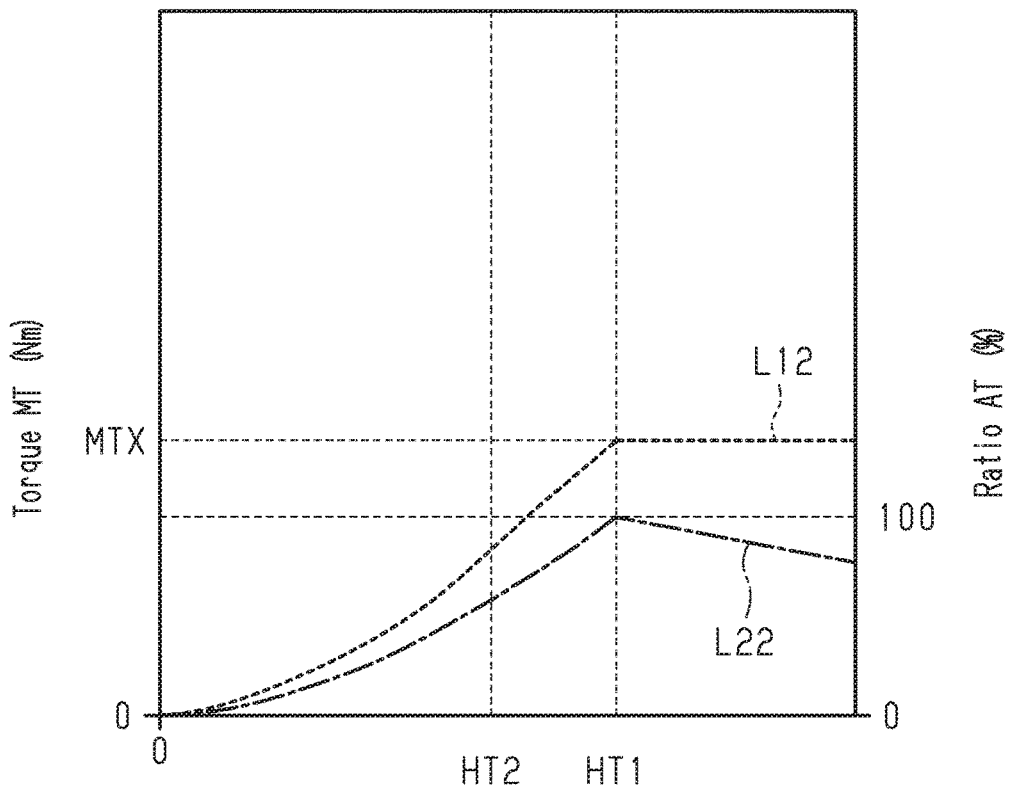
FIG. 7 is a graph that corresponds to information related to a first predetermined value stored in the data storage in accordance with a second embodiment and shows the relationship between the torque of the human driving force and the torque of the assist force produced by the motor and the relationship between the torque of the human driving force and the ratio.

A broken line L12 shown in FIG. 7 illustrates an example of a relationship between the torque HT of the human driving force H corresponding to the second control information and the torque MT of the assist force M produced by the motor 38. The broken line L12 can be a downwardly bulged curve, a straight line, an upwardly bulged curve, or a bent line in a range in which the torque HT of the human driving force H is greater than or equal to 0 Nm and less than or equal to the first predetermined value HT1. In a case where the broken line L12 is a bent line in a range in which the torque HT of the human driving force H is greater than or equal to 0 Nm and less than or equal to the first predetermined value HT1, the controller 42 can control the motor 38 so that a response speed of the change in the torque MT of the assist force M produced by the motor 38 to the change in the human driving force H at the bent point of the broken line L12 and the vicinity of the bent point decreases such that the torque MT of the assist force M produced by the motor 38 does not suddenly change in accordance with the change in the human driving force H.

A single-dashed line L22 shown in FIG. 7 illustrates an example of a relationship between the torque HT of the human driving force H corresponding to the information related to the first predetermined value HT1 and the ratio AT. The single-dashed line L22 is a bent line that increases in accordance with the increase in the torque HT of the human driving force H in a case where the torque HT of the human driving force H is greater than or equal to 0 Nm, and that decreases linearly in accordance with the increase in the torque HT of the human driving force H in a case where the torque HT of the human driving force H is greater than or equal to the first predetermined value HT1. In FIG. 7, for example, the maximum value MTX of the torque MT is equal to the first predetermined value HT1.

A process for controlling the motor 38 will now be described with reference to FIGS. 8 and 5. Upon the supply of electric power to the controller 42, the controller 42 starts the process and proceeds to step S31 of the flowchart shown in FIG. 8. Whenever the flowchart of FIG. 8 ends, the controller 42 repeats the process from step S31 in predetermined cycles until the supply of electric power is stopped.

In step S31, the controller 42 determines whether torque HT of the human driving force H increased from 0 Nm to greater than 0 Nm. In a case where the torque HT of the human driving force H has not increased from 0 Nm to greater than 0 Nm, the controller 42 ends the process. In a case where the torque HT of the human driving force H has increased from 0 Nm to greater than 0 Nm, the controller 42 proceeds to step S12. After step S12, the controller 42 executes the same process as the process from step S12 in FIGS. 4 and 5 of the first embodiment.

Modifications

The description related with the above embodiments exemplifies, without any intention to limit, an applicable form of a control device for a human-powered vehicle in accordance with the present disclosure. In addition to the embodiments described above, the control device for the human-powered vehicle in accordance with the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

Figure 4:
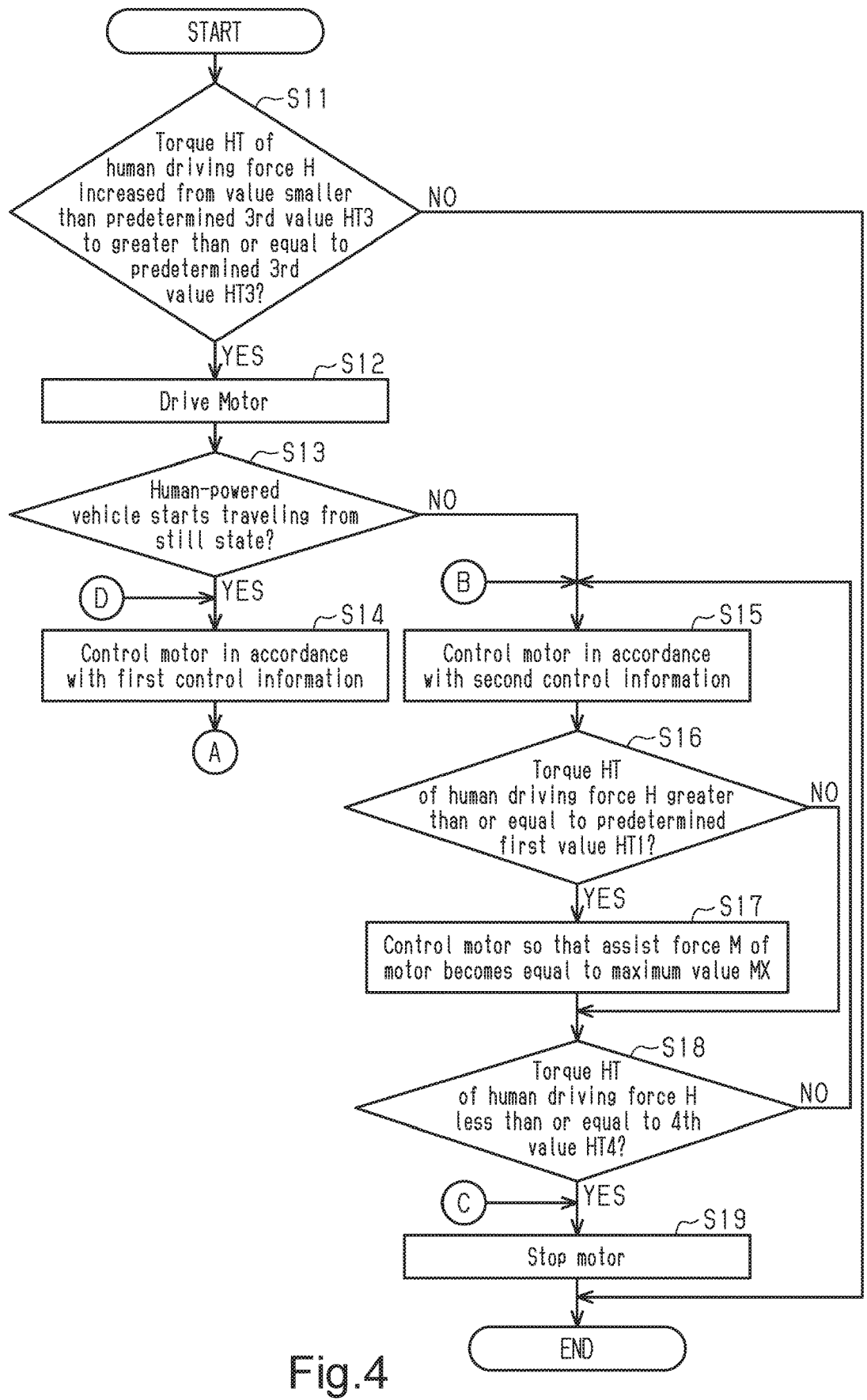
FIG. 4 is a first portion of a flowchart of a process for controlling the motor executed by the electronic controller in FIG. 2.
Figure 5:
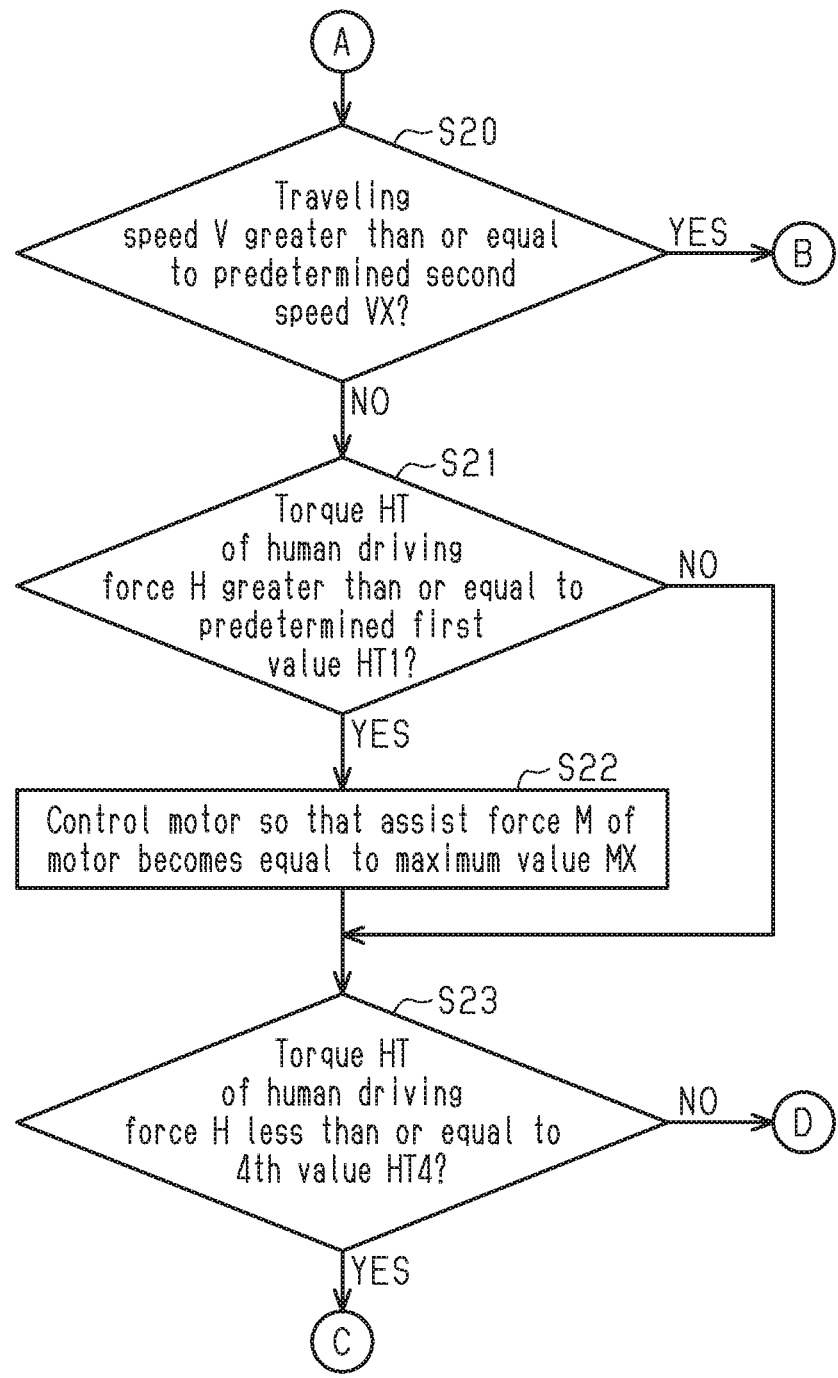
FIG. 5 is a second portion of a flowchart of the process for controlling the motor executed by the electronic controller in FIG. 2.

In an embodiment including the first embodiment or a modification in accordance with the first embodiment, the controller 42 can omit the processes of step S11, step S12, step S13, step S14, step S18, step S19, step S20, step S21, step S22 and step S23 in FIGS. 4 and 5. In an embodiment including the first embodiment or a modification in accordance with the first embodiment, the controller 42 can omit the processes of step S11, step S12, step S13, step S14, step S16, step S17, step S18, step S19, step S20, step S21, step S22 and step S23 in FIGS. 4 and 5. In an embodiment including the second embodiment or a modification in accordance with the second embodiment, the controller 42 can omit the processes of step S31, step S12, step S13, step S14, step S18, step S19, step S20, step S21, step S22 and step S23 in FIG. 8. In an embodiment including the second embodiment or a modification in accordance with the second embodiment, the controller 42 can omit the processes of step S31, step S12, step S13, step S14, step S16, step S17, step S18, step S19, step S20, step S21, step S22 and step S23 in FIG. 8. For example, the processes shown in FIGS. 4, 5, and 8 can be changed to the process shown in FIG. 9. A process for controlling the motor 38 will now be described with reference to FIG. 9. With supply of power to the controller 42, the controller 42 starts the process and proceeds to step S41 of the flowchart shown in FIG. 9. With termination of the flowchart of FIG. 9, the controller 42 repeats the process from step S41 after a predetermined cycle until the supply of power is stopped.

In step S41, the controller 42 determines whether the torque HT of the human driving force H is greater than or equal to the first predetermined value HT1. In a case where the torque HT of the human driving force H is greater than or equal to the first predetermined value HT1, the controller 42 proceeds to step S42. In step S42, the controller 42 is configured to control the motor 38 so that the assist force M of the motor 38 becomes equal to the maximum value MX, and ends the process. In a case where the torque HT of the human driving force H is not greater than or equal to the first predetermined value HT1 in step S41, the controller 42 proceeds to step S43. In step S43, the controller 42 is configured to control the motor 38 in accordance with the second control information, and ends the process.

Figure 8:
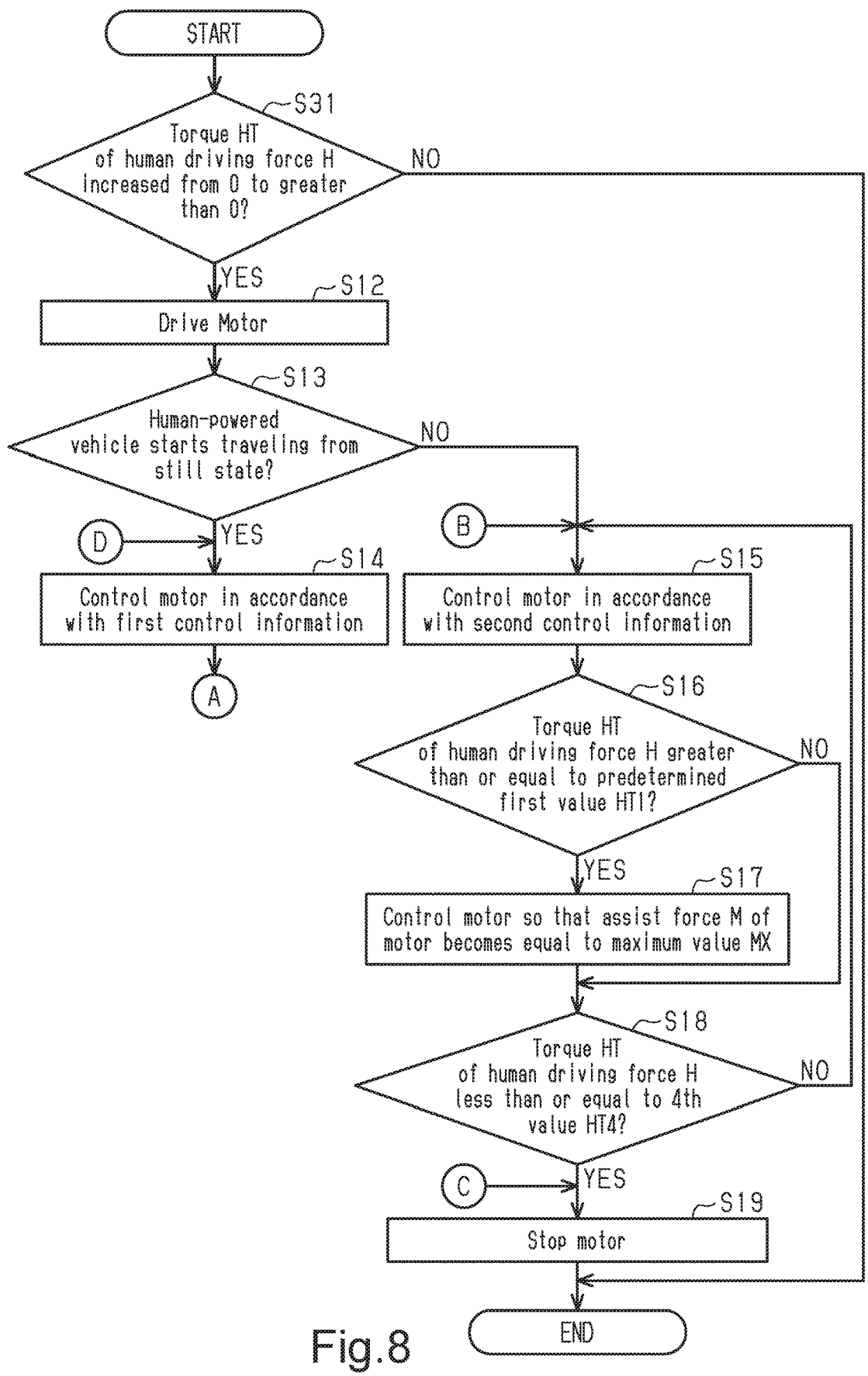
FIG. 8 is a first portion of a flowchart of a process for controlling the motor executed by the electronic controller in accordance with the second embodiment.
Figure 9:
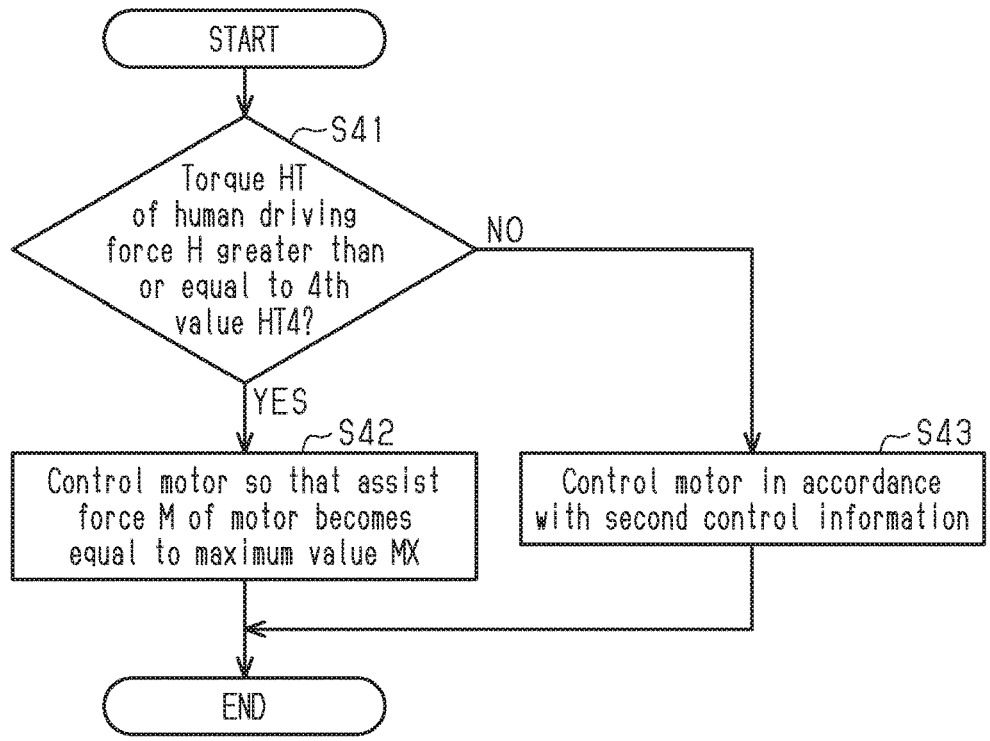
FIG. 9 is a flowchart of a process for controlling the motor executed by the electronic controller in accordance with a first modification.

In an embodiment including the first embodiment, the second embodiment, the modification in accordance with the first embodiment or the modification in accordance with the second embodiment, the processes of step S13, step S14, step S20, step S21, step S22 and step S23 in FIG. 4, 5, or 8 can be omitted. In this case, the controller 42 proceeds to step S15 after executing the process of step S12.

In an embodiment including the first embodiment, the second embodiment, the modification in accordance with the first embodiment or the modification in accordance with the second embodiment, the controller 42 can be configured to control the motor 38 so that the power MW of the assist force M produced by the motor 38 becomes smaller than the maximum value MWX in a case where the torque HT of the human driving force H is smaller than the first predetermined value HT1, and to control the motor 38 so that the power MW of the assist force M produced by the motor 38 becomes equal to the maximum value MWX in a case where the torque HT of the human driving force H becomes equal to the first predetermined value HT1. The controller 42 can be configured to control the motor 38 so that the power MW of the assist force M of the motor 38 increases as the power HW of the human driving force H increases in a case where the torque HT of the human driving force H is smaller than the first predetermined value HT1. The maximum value MWX is a value of 250 watts or greater and 600 watts or less. In one example, the maximum value MWX is 500 watts. In another example, the maximum value MWX is 300 watts. Preferably, in the present modification, the first control information and the second control information include at least one of a table, a function, and a map in which the torque HT of the human driving force H and the power MW of the assist force M by the motor 38 are associated. In the present modification, the first change ratio R1 includes a first change ratio RW1 of an increase in the power MW of the assist force M produced by the motor 38 with respect to an increase in the power HW of the human driving force H in a case where the human-powered vehicle 10 starts to travel from a still state. The second change ratio R2 includes a second change ratio RW2 of an increase in the power MW of the assist force M produced by the motor 38 with respect to an increase in the power HW of the human driving force H in a case where the human-powered vehicle 10 is traveling. Preferably, in the present modification, in at least part of a range in which the torque HT of the human driving force H is less than or equal to the first predetermined value HT1, the controller 42 is configured to control the motor 38 so that a first change ratio RW1 of an increase in the power MW of the assist force M produced by the motor 38 to an increase in the power HW of the human driving force H in a case where the human-powered vehicle 10 starts to travel from a still state becomes higher than a second change ratio RW2 of an increase in the power MW of the assist force M produced by the motor 38 to an increase in the power HW of the human driving force H in a case where the human-powered vehicle 10 is traveling.

In an embodiment including the first embodiment, the second embodiment, the modification in accordance with the first embodiment or the modification in accordance with the second embodiment, the torque HT of the human driving force H can be replaced with the power HW of the human driving force H and the torque MT of the assist force M can be replaced with the power MW of the assist force M. In this case, the first predetermined value HT1 is replaced with the first predetermined value HW1, the second predetermined value HT2 is replaced with a second predetermined value HW2, and the third predetermined value HT3 is replaced with a third predetermined value HW3. The first predetermined value HW1 is, for example, a value in a range of 300 watts or greater and 600 watts or less. Preferably, the first predetermined value HW1 is a value in a range of 400 watts or greater and 500 watts or less. Preferably, the controller 42 is configured to control the motor 38 so that the ratio AW becomes less than or equal to 200 percent in a case where the power HW of the human driving force H is larger than or equal to the first predetermined value HW1. In the present modification, the controller 42 is configured to control the motor 38 so that the ratio AW becomes less than or equal to 150 percent in a case where the power HW of the human driving force H is larger than or equal to the first predetermined value HW1. Preferably, in the present modification, the first control information and the second control information include at least one of a table, a function, and a map in which the power HW of the human driving force H and the power MW of the assist force M by the motor 38 are associated.

Figure 10:
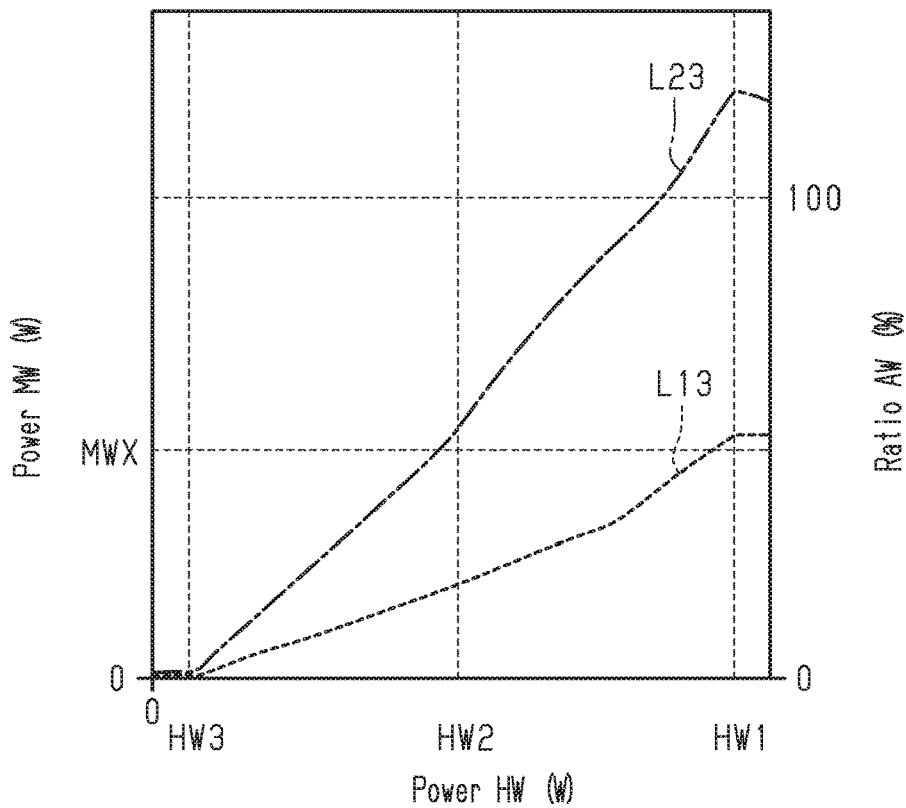
FIG. 10 is a graph that corresponds to information related to a first predetermined value stored in the data storage in accordance with a second modification and shows the relationship between the power of the human driving force and the power of the assist force produced by the motor and the relationship between the power of the human driving force and the ratio.

A broken line L13 shown in FIG. 10 illustrates an example of a relationship between the power HW of the human driving force H corresponding to the second control information and the power MW of the assist force M produced by the motor 38. In the broken line L13, the power MW of the assist force M by the motor 38 in a case where the power HW of the human driving force H is smaller than the third predetermined value HW3 is 0 W (Watt). The broken line L13 can be a downwardly bulged curve, a straight line, an upwardly bulged curve, or a bent line in a range in which the power HW of the human driving force H is greater than or equal to the third predetermined value HW3 and less than or equal to the first predetermined value HW1. In a case where the broken line L13 is a bent line in a range in which the power HW of the human driving force H is greater than or equal to the third predetermined value HW3 and less than or equal to the first predetermined value HW1, the controller 42 can control the motor 38 so that a response speed of the change in the power MW of the assist force M produced by the motor 38 to the change in the human driving force H at the bent point of the broken line L13 and the vicinity of the bent point decreases such that the power MW of the assist force M produced by the motor 38 does not suddenly change in accordance with the change in the human driving force H.

A single-dashed line L23 shown in FIG. 10 illustrates an example of a relationship between the power HW of the human driving force H corresponding to the information related to the first predetermined value HW1 and the ratio AW. In the single-dashed line L23, the ratio AW in a case where the power HW of the human driving force H is smaller than the third predetermined value HW3 is 0%. The single-dashed line L23 is a bent line that increases in accordance with the increase in the power HW of the human driving force H in a case where the power HW of the human driving force H is larger than or equal to the third predetermined value HW3, and that decreases linearly in accordance with the increase in the power HW of the human driving force H in a case where the power HW of the human driving force H is larger than or equal to the first predetermined value HW1.

In an embodiment including the first embodiment, the second embodiment, the modification in accordance with the first embodiment or the modification in accordance with the second embodiment, the controller 42 can be configured to control the motor 38 so that the torque MT of the assist force M produced by the motor 38 becomes smaller than the torque HT of the human driving force H in a case where the torque HT of the human driving force H is smaller than the second predetermined value HT2 smaller than the first predetermined value HT1 and to the motor 38 so that the torque MT of the assist force M produced by the motor 38 becomes greater than or equal to the torque HT of the human driving force H in a case where the torque HT of the human driving force H is greater than or equal to the second predetermined value HT2.

Figure 11:
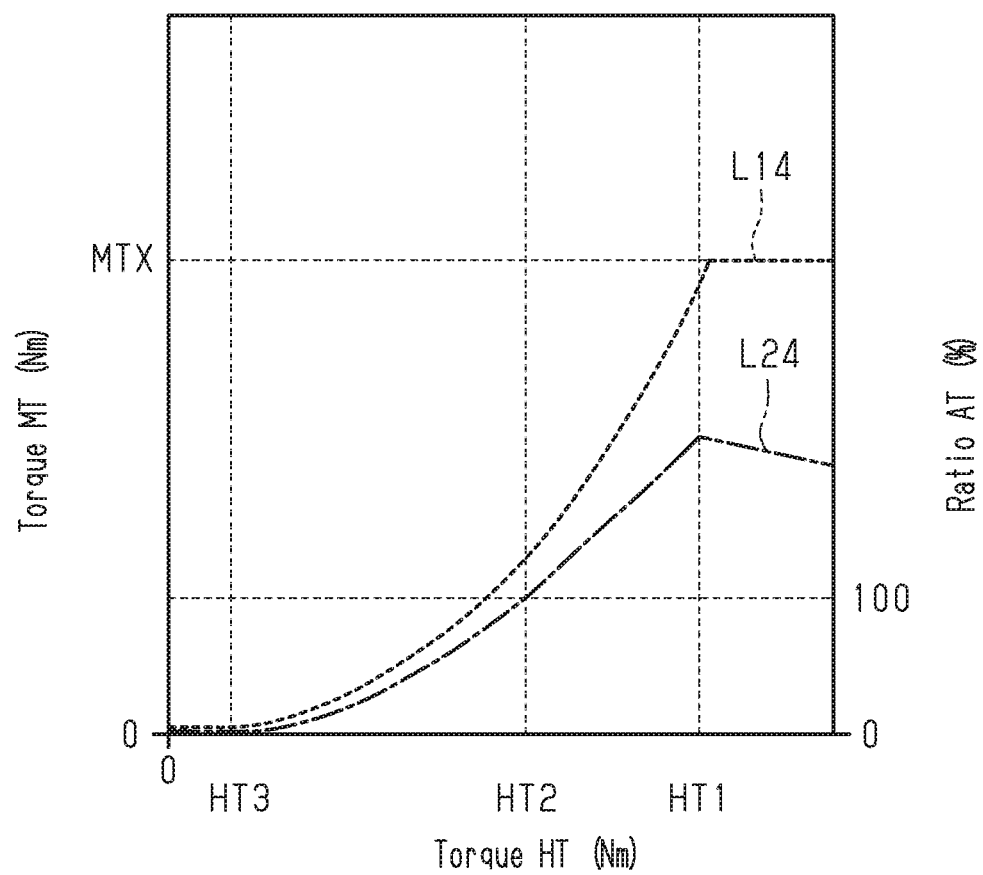
FIG. 11 is a graph that corresponds to information related to a first predetermined value stored in data storage in accordance with a third modification and shows the relationship between the torque of the human driving force and the torque of the assist force produced by the motor and the relationship between the torque of the human driving force and the ratio.

A broken line L14 shown in FIG. 11 illustrates an example of a relationship between the torque HT of the human driving force H corresponding to the second control information and the torque MT of the assist force M produced by the motor 38. In the broken line L14, the torque MT of the assist force M produced by the motor 38 in a case where the torque HT of the human driving force H is smaller than the third predetermined value HT3 is 0 Nm. The broken line L14 can be a downwardly bulged curve, a straight line, an upwardly bulged curve, or a bent line in a range in which the torque HT of the human driving force H is greater than or equal to the third predetermined value HT3 and less than or equal to the first predetermined value HT1. In a case where the broken line L14 is a bent line in a range in which the torque HT of the human driving force H is greater than or equal to the third predetermined value HT3 and less than or equal to the first predetermined value HT1, the controller 42 can control the motor 38 so that a response speed of the change in the torque MT of the assist force M produced by the motor 38 to the change in the human driving force H at the bent point of the broken line L14 and the vicinity of the bent point decreases such that the torque MT of the assist force M produced by the motor 38 does not suddenly change in accordance with the change in the human driving force H. In FIG. 11, for example, the maximum value MTX of the torque MT is a value exceeding the first predetermined value HT1. A single-dashed line L24 shown in FIG. 11 is configured to indicate the ratio AT in the same manner as the single-dashed line L21 shown in FIG. 3. In the present modification, the controller 42 is configured to control the motor 38 so that the ratio AT becomes equal to 100 percent in a case where the human driving force H is the second predetermined value HT2.

In an embodiment including the first embodiment, the second embodiment, the modification in accordance with the first embodiment or the modification in accordance with the second embodiment, the controller 42 can be configured to control the motor 38 so that the ratio AT becomes greater than 200 percent in a case where the torque HT of the human driving force H is greater than or equal to the first predetermined value HT1. In an embodiment including the first embodiment, the second embodiment, the modification in accordance with the first embodiment or the modification in accordance with the second embodiment, the controller 42 can be configured to control the motor 38 so that the ratio AW becomes greater than 200 percent in a case where the power HW of the human driving force H is larger than or equal to the first predetermined value HW1.

In an embodiment including the first embodiment, the second embodiment, the modification in accordance with the first embodiment or the modification in accordance with the second embodiment, the controller 42 can change the second change ratio R2 in accordance with the acceleration of a crank rotational speed, the traveling speed V, and the acceleration of the traveling speed V. The controller 42 decreases the response speed of the change in the assist force M of the motor 38 with respect to the change in the torque HT of the human driving force H, for example, in a case of at least one of a case where the acceleration of the crank rotational speed is increased, a case where the traveling speed V is increased, and a case where the acceleration of the traveling speed V is increased. The controller 42 increases the response speed of the change in the assist force M of the motor 38 with respect to the change in the torque HT of the human driving force H, for example, in a case of at least one of a case where the acceleration of the crank rotational speed is decreased, a case where the traveling speed V is decreased, and a case where the acceleration of the traveling speed V is decreased.

The expression "at least one" as used in the present specification means "one or more" of the desired options. As an example, the expression "at least one" as used in the present specification means "only one option" or "both of two options" if the number of options is two. As another example, the expression "at least one" as used in the present specification means "only one option" or "combination of two or more arbitrary options" if the number of options is three or more.

What is claimed is:

1. A control device for a human-powered vehicle, the control device comprising:
    an electronic controller configured to control a motor configured to apply an assist force to the human-powered vehicle, the electronic controller controlling the motor so as to change a ratio of the assist force produced by the motor to a human driving force in accordance with the human driving force; and
    a data storage,
    the electronic controller being configured to control the motor so that the assist force produced by the motor becomes smaller than a maximum value upon determining that the human driving force is smaller than a first predetermined value, and to control the motor so that the assist force produced by the motor is prevented from exceeding the maximum value upon determining that the human driving force is equal or larger than the first predetermined value, the ratio decreasing as the human driving force increases beyond the first predetermined value,
    the data storage being configured to store information related to the first predetermined value in a changeable manner, and
    the electronic controller being configured to communicate with an operation unit or an external device and to change the first predetermined value in response to a signal received from the operation unit or the external device.

2. The control device according to claim 1, wherein the electronic controller is configured to control the motor so that the ratio becomes less than or equal to 200 percent.

3. The control device according to claim 2, wherein the electronic controller is configured to control the motor so that the assist force produced by the motor becomes smaller than the human driving force upon determining the human driving force is smaller than the first predetermined value.

4. The control device according to claim 2, wherein the electronic controller is configured to control the motor so that the assist force produced by the motor becomes smaller than the human driving force.

5. The control device according to claim 1, wherein the electronic controller is configured to control the motor so as to change a change rate of the assist force with respect to the human driving force upon determining that the human driving force is smaller than the first predetermined value.

6. The control device according to claim 1, wherein the electronic controller is configured to drive the motor in accordance with the human driving force upon determining the human driving force changes from a value smaller than a third predetermined value to a value larger than or equal to the third predetermined value, the third predetermined value being smaller than the first predetermined value.

7. The control device according to claim 1, wherein in at least part of a range in which the human driving force is less than or equal to the first predetermined value, the electronic controller is configured to control the motor so that a first change ratio of an increase in an output of the motor to an increase in the human driving force upon determining the human-powered vehicle starts to travel from a still state becomes higher than a second change ratio of an increase in the output of the motor to an increase in the human driving force while the human-powered vehicle is traveling.

8. The control device according to claim 1, wherein the electronic controller is configured to control the motor so that the ratio differs between a case where an output of the motor is increased in accordance with an increase in the human driving force and a case where the output of the motor is decreased in accordance with a decrease in the human driving force.

9. The control device according to claim 1, wherein the electronic controller is configured to control the motor so that the ratio in a case where the output of the motor is increased in accordance with an increase in the human driving force is larger than the ratio in a case where the output of the motor is decreased in accordance with a decrease in the human driving force.

10. The control device according to claim 1, wherein the assist force and the human driving force is measured in units of power, and
the first predetermined value is a value in a range of 200 watts or greater and 600 watts or less.

11. The control device according to claim 1, wherein the assist force and the human driving force are measured in units of power.

12. The control device according to claim 1, wherein the assist force and the human driving force are measured in units of torque, and
the first predetermined value is a value in a range of 50 Nm or greater and 130 Nm or less.

13. The control device according to claim 1, wherein the assist force and the human driving force is measured in units of torque.

14. A control device for a human-powered vehicle, the control device comprising:
    an electronic controller configured to control a motor configured to apply an assist force to the human-powered vehicle, the electronic controller controlling the motor so as to change a ratio of the assist force produced by the motor to a human driving force in accordance with the human driving force, the electronic controller being configured to control the motor so that the assist force produced by the motor becomes smaller than a maximum value upon determining that the human driving force is smaller than a first predetermined value, and to control the motor so that the assist force produced by the motor becomes equal to the maximum value upon determining that the human driving force is equal or larger than the first predetermined value, the ratio decreasing as the human driving force increases beyond the first predetermined value, the electronic controller being configured to control the motor so that the assist force produced by the motor becomes equal to or smaller than the human driving force upon determining that the human driving force is smaller than or equal to a second predetermined value that is smaller than the first predetermined value, and the electronic controller being configured to control the motor so that the assist force produced by the motor becomes greater than the human driving force upon determining the human driving force is greater than the second predetermined value.

15. A control device for a human-powered vehicle, the control device comprising:
- a data storage that stores control information, the control information including a first control information and a second control information, the first control information being different from the second control information; and
- an electronic controller configured to control a motor configured to apply an assist force to the human-powered vehicle, the electronic controller controlling the motor based on the control information so as to change a ratio of the assist force produced by the motor to a human driving force in accordance with the human driving force, the control information being configured to control the motor so that the assist force produced by the motor becomes smaller than a maximum value upon determining that the human driving force is smaller than a first predetermined value, and to control the motor so that the assist force produced by the motor becomes equal to the maximum value upon determining that the human driving force is equal or larger than the first predetermined value, the ratio decreasing as the human driving force increases beyond the first predetermined value, the electronic controller being configured to selectively use the first control information or the second control information as the control information, each of the first control information and the second control information defining a characteristic of the ratio with respect to the human driving force and a characteristic of the assist force with respect to the human driving force, the first control information and the second control information being configured such that a change rate of the assist force with respect to the human driving force as the torque of the human driving force increases is different for the first control information than for the second control information in a region where the human driving force is smaller than the first predetermined value.

16. The control device according to claim 15, wherein the characteristics defined by at least one of the first control information and the second control information are nonlinear.

17. The control device according to claim 15, wherein the electronic controller is configured to select the first control information when the human powered vehicle starts to travel from a still state, and to select the second control information when the human powered vehicle is traveling.

* * * * *